United States Patent [19]

Dietrich et al.

[11] Patent Number: 4,752,450
[45] Date of Patent: Jun. 21, 1988

[54] APPARATUS FOR CLEANING SULPHUR AND NITROGEN CONTAINING FLUE GAS

[75] Inventors: Walter Dietrich, Hanau am Main; Heinrich Amlinger, Niddatal, both of Fed. Rep. of Germany

[73] Assignee: Leybold-Heraeus GmbH, Cologne, Fed. Rep. of Germany

[21] Appl. No.: 882,599

[22] Filed: Jul. 7, 1986

[30] Foreign Application Priority Data

Jul. 11, 1985 [DE] Fed. Rep. of Germany ....... 3524729

[51] Int. Cl.⁴ .............................................. B01J 19/08
[52] U.S. Cl. .............................. 422/186; 250/432 R; 250/492.3; 250/438; 110/203
[58] Field of Search ............. 422/186, 186.01, 186.03, 422/186.22, 186.21; 250/432 R, 435, 438, 492.3, 400; 204/157.3; 60/275; 110/203

[56] References Cited

U.S. PATENT DOCUMENTS

| | | | |
|---|---|---|---|
| 3,120,609 | 2/1964 | Farrell | 250/492.3 X |
| 3,389,971 | 6/1968 | Alliger | 422/186 X |
| 3,655,965 | 4/1972 | Icre et al. | 250/492.3 X |
| 4,396,580 | 8/1983 | Patrick et al. | |
| 4,397,823 | 8/1983 | Dimpfl | 422/186 X |
| 4,563,258 | 1/1986 | Bridges | 422/186 X |
| 4,595,569 | 6/1986 | Reuter et al. | 422/186 |

FOREIGN PATENT DOCUMENTS

| | | |
|---|---|---|
| 2154152 | 3/1973 | Fed. Rep. of Germany . |
| 3020301 | 12/1981 | Fed. Rep. of Germany . |
| 7015394 | 4/1977 | Japan ............................. 204/157.3 |

OTHER PUBLICATIONS

DE-Z: Energie, Jg. 37, No. 1-2, pp. 26-29.
JP-Z: Asahi Evening News for Wicem: Japanese Industry in Action against Environmental Pollution 1984, pp. 21-24.
JP-52-37554: English version of unexamined published Japanese patent appln.
JP-53-17568: English version of unexamined published Japanese patent appln.

Primary Examiner—Edward A. Miller
Assistant Examiner—Susan Wolffe
Attorney, Agent, or Firm—Felfe & Lynch

[57] ABSTRACT

Disclosed is an apparatus for cleaning sulphur and nitrogen containing flue gases by adding gaseous reagents and by a reaction in a reaction chamber which the reactants pass through in the axial direction and are exposed to at least one electorn beam. The apparatus includes at least one reaction chamber and at least one electron beam source from which the electron beam is admitted into the reaction chamber through at least one pressure step zone. The electron beam source is structurally combined with the reaction chamber in such a manner that the axis of the pressure step stage runs parallel to the axis of the reaction chamber and that the electron beam can be rotationally deflected about this axis to traverse each surface element of a flow cross section of the reaction chamber running perpendicular to the axis at at least one position in the flow path.

10 Claims, 3 Drawing Sheets

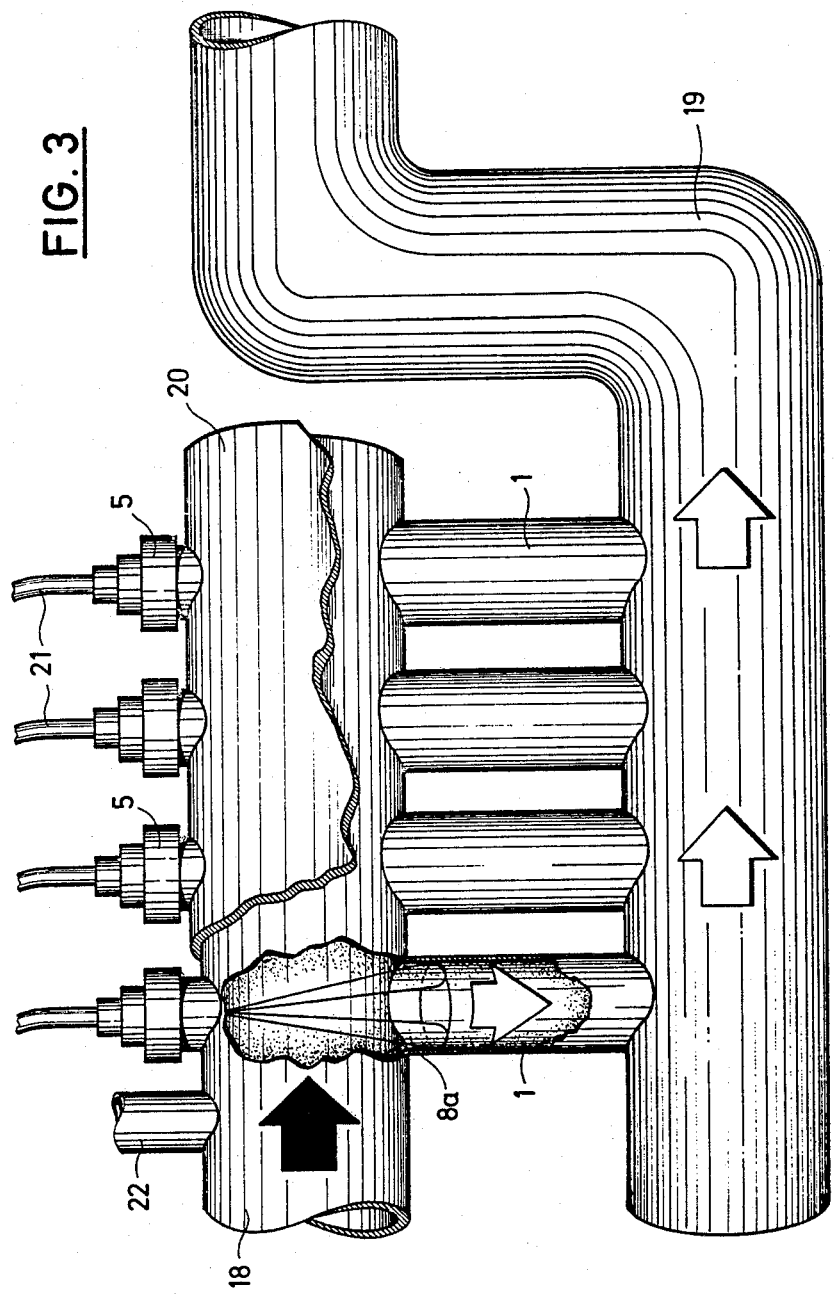

APPARATUS FOR CLEANING SULPHUR AND NITROGEN CONTAINING FLUE GAS

BACKGROUND OF THE INVENTION

The present invention is in an apparatus for cleaning sulphur and nitrogen containing flue gases.

Such a process is especially provided for use with so-called large boiler plants such as in power plants, to reduce the emission of dangerous oxygen compounds, such as sulphur ($SO_x$), to a minimum and to comply with environmental protection requirements.

From the pamphlet "Electron Beam Flue Gas Cleanup Process" of the firm Ebara/Japan a process of the above described type is already known in which an approximately stoichiometric quantity of ammonia gas ($NH_3$) is added to the flue gas before the reactive mixture is subjected to the effect of electron beams. Thereby the harmful components of the flue gas are converted to ammonium sulphate or ammonium nitrate, which are both suitable for use as fertilizer in agriculture.

The problem is experienced therein of introducing the electron beams, whose source—as a rule an electron-emitting cathode heated up to a high temperature—can only operate under high vacuum, into the reaction chamber, whose contents are at or above atmospheric pressure. Electron beams have the property of spreading out or diverging in a gaseous atmosphere through collisions with the gas molecules, so that their range after emerging from the vacuum is already considerably reduced at atmospheric pressure. Thus a large proportion of electron beam treatment processes are carried out under high or at least partial vacuum. A further problem arises in bringing about a desirably homogeneous interaction between the reaction mixture on the one hand and the electron beams on the other.

In the known process the electron beams are produced with an accelerating potential of 300 kV and injected into the reaction chamber through a "window" comprising a thin metal foil (Ti-Pd). The foil-window forms a barrier between the electron beam source, which is under high vacuum on the one hand, and the atmosphere in the reaction chamber on the other, but it is of sufficiently thin formation to be at least partially transparent to electron beams. The electron beams are periodically deflected over the window area by a special deflection system attached to the electron beam source so that the foil-window is not damaged by the beam's high energy density.

Such a process and the apparatus required for it have numerous disadvantages: the accelerating potential of 300 kV necessary to penetrate the foil-window requires an expensively constructed electron beam gun on account of the necessary insulation requirements. At the same time such a high accelerating potential produces strong X-rays at the point of incidence, so that extensive radiation shielding is required. Consequently, the foil-windows have a high transmission loss of about 25% which, with the necessary high usage of electricity, leads not only to correspondingly high losses but also to an extraordinarily high thermal loading on the window. Another consequence is that because of the interaction of the foil-window with the contents of the reaction chamber, it is necessary to replace the window frequently, so that a relatively large proportion of downtime of the whole cleaning plant is experienced. Thus, when a large boiler plant is in continuous operation, a plurality of cleaning plants, in parallel connection, must be provided.

It is on that account proposed in DE-OS No. 3501158 that, instead of electron beam guns (300–800 kV accelerating potential) provided with windows, use be made of such guns in which the electron beam passes through pressure step stages from high vacuum—in which it is produced—into the reaction chamber which stands at normal pressure (about 200 kV—accelerating potential). Such arrangements bring, on account of dispensing with the window, the advantage of simpler shielding against the X-rays produced by interaction of the electron beam with the material and escaping from the arrangement, and opening up also, for the increase of productivity, simpler and less costly technical possibilities. The proposal includes also arrangements as to how the electron beams can be brought into the reaction chamber and steered by electromagnetic control equipment in the reaction zone and dynamically distributed.

SUMMARY OF THE INVENTION

The present invention is for providing a close interconnection and conformity between the gas supply system and the electron beam to avoid, or at least minimize, the problems encountered by the prior art.

The invention comprises apparatus for cleaning sulphur and/or nitrogen containing flue gases by adding gaseous reagents, preferably ammonia gas, and reacting the flue gases with the reagents in a reaction chamber through which the reactants pass in the axial direction at pressures between 1 and 5 bar under the action of electron beams, having at least one reaction chamber and at least one evacuable electron beam source provided with its own deflection arrangement, from which the electron beam is admitted into the reaction chamber through at least one pressure step stage surrounding the beam path. The electron beam source is structurally combined with the reaction chamber, in such a manner that the axis of the pressure step stage is parallel to the axis of the reaction chamber and the electron beam can be rotationally deflected about this axis, so that each surface element of a flow cross-section of the reaction chamber running perpendicular to the axis can be traversed by the electron beam at at least one position in the flow path. A deflector generator is conceptually depicted as C in FIG. 1.

Due to the axially parallel arrangement of the pressure step stage and reaction chamber and the coaxial rotation of the deflected electron beam, an improved interaction of the reaction mixture with the electron beam is possible in that a sufficiently high dosage results so that the whole reaction mixture is stoichiometrically convertible. Preferably, a pressure step stage and reaction chamber are arranged exactly or substantially coaxially. A suitable electron beam is, even in the undeflected condition, slightly fanned out (divergence angle of some 1 to 10 degrees) so that each volume element of the reaction mixture comes into interaction with the electrons of the electron beam, provided that for a given throughput or given flow velocity a sufficiently high deflection or rotation frequency of the electron beam is chosen. It has been shown that an effective chemical reaction is produced at a minimum beam intensity of about 1.5 megarad or some 15 joule/gram.

To achieve this minimum beam intensity the deflection of the electron beam is so adjusted that the range of the electron beam is adequate for the prescribed minimum beam intensity.

A particularly advantageous arrangement is obtained when the electron beam is deflectable in a circular-section reaction chamber in a conical space of which the point of emanation is located in the vicinity of the pressure steps stage and the base surface fills the flow cross-section with a radiation dosage that amounts at every point to at least 1.5 megarad.

The axis of the electron beam can be rotated in the surface of the cone. It is also possible to allow the theoretical foot (point on base surface) of the axis of the electron beam in the base surface to make periodic spiral movements, i.e., the said foot follows with rapid repetition a predetermined spiral path, so that the described conical space will be traversed extremely homogeneously by the electron beam. It should always be ensured that the reaction mixture is forced to pass through the conical space.

It is also possible in a polyogonal cross-section reaction chamber, i.e., square or rectangle, to deflect, in analogous fashion, the electron beam in a corresponding pyramidal space. The axis of the pyramid again is preferably coincident with the axis of the reaction chamber in the direction of flow.

The maximum angle of deflection of the electron beam (with respect to its original direction or with respect to the axis of the pressure step stage) can be easily determined. If the angle of deflection is too small, then the electron beam only reaches the wall of the reaction chamber when its radiation dosage has dropped below the stated limit of about 1.5 megarad. Then the peripheral flow will no longer be subjected to a sufficient intensity of radiation, because the electron beam has already lost a large part of its energy on its path through the core flow. If the angle of deflection chosen is on the other hand too large, then not only is the period the reaction mixture is exposed to the deflection zone of the electron beam too short, but a large part of the beam energy is wasted in interaction with the wall of the chamber, an occurrence which is accompanied by an undesired heating up of the chamber wall. Between these limiting cases lies a suitable deflection angle which, it will be understood, is effected by the cross-section of the reaction chamber.

It is for constructional reasons particularly useful if the reaction chamber is connected to an elbow to whose wall portion, which is situated in the projection face of the reaction chamber, the electron beam source is affixed.

If a large mass flow of reaction mixture is to be cleaned, then it is particularly advantageous, according to a further development of the invention, if the reaction chamber is connected to a supply arrangement, through which a plurality of component flows of the reaction mixture can be fed to the reaction chamber which can be deflected in the supply arrangement out of a first radial flow direction into an axial flow direction extending along the reaction chamber.

Guide vanes can be used in the supply arrangement to produce a swirling flow in the reaction chamber, by which the reaction mixture and/or its interaction with the electron beam is homogenized.

It is further particularly advantageous if the electron beam source is so aligned with the reaction chamber that the beam direction and flow direction at least substantially coincide. In this embodiment, the reaction mixture and reaction products (solids) are moving away from the pressure step stage, so that in particular no reaction product precipitates in the vicinity of the pressure step stage, and especially not in the pressure step stage itself.

The inventive apparatus can also be utilized with exceptional advantage in a battery form of construction.

This is first of all possible by arranging a plurality of reaction chambers each with an electron beam source in parallel connection between a distributor duct and a collector duct (FIG. 4).

A variant of this battery form is according to a further development of the invention characterized in that between a distributor duct and a parallel collector duct are arranged a plurality of reaction chambers with parallel axes perpendicular to the axes of the distributor and collector ducts and that an electron beam source is located on the wall portion of the distributor duct lying in the projection face of each reaction chamber (FIG. 3).

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 3 depicts a battery arrangement of four reaction chambers, which are arranged in a straight line between a distributor duct and a parallel collector duct.

DESCRIPTION OF THE PREFERRED EMBODIMENT

Figure 1:
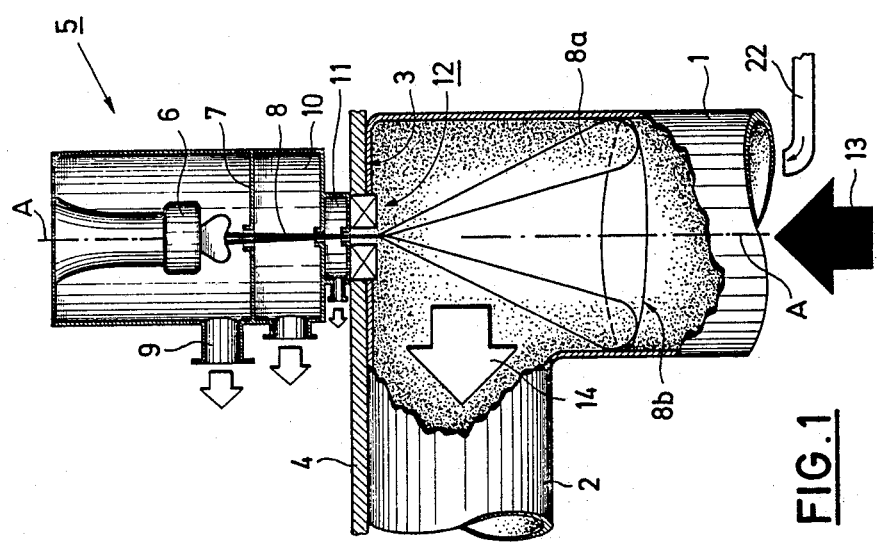
FIG. 1 is a front elevation view in partial cutaway of an electron beam source and the upper part of a reaction chamber which is connected to an elbow.

Referring to FIG. 1, the upper part of a cylindrical reaction chamber 1, has directly connected at its top, an elbow 2. Elbow 2 has a wall portion 3 lying in the projection surface (projection of cross section) of the reaction chamber 1, on which, with the interposition of a mounting plate 4, is located a known electron beam source 5, which comprises a beam generator 6, and an accelerating anode 7 which produces a thin focussed electron beam 8. The common axis of the reaction chamber 1 and electron beam source 5 is designated as A—A.

The electron beam source 5 is evacuable through a suction conduit 9 in the vicinity of the beam generator 6 in order to produce the necessary working vacuum. The accelerating anode 7, which is provided with a beam exit opening, simultaneously forms a barrier to a pressure step stage connected below, which in likewise known manner comprises two chambers 10 and 11 connected one to the other, in which further separator, not referenced, is also arranged a narrow bore for the beam exit. There is also provided in the lower boundary wall of chamber 11 a narrow exit opening for the electron beam 8 through which the electron beam enters into the reaction chamber 1 or the elbow 2. The chambers 10 and 11 are connected to a set of vacuum pumps by suitable suction leads for extracting any gas that enters, all this being indicated only by an arrow.

Beneath the chamber 11 of the pressure step stage is arranged an electromagnetic deflection arrangement 12, which has a plurality of poles, so that the electron beam 8 is deflectable in the X and Y directions. To achieve this, the deflection arrangement 12 is connected with a (known) deflection generator, not shown here, which produces appropriate deflection potentials so that the axis of the electron beam 8a on the other side of the deflection arrangement 12 can be guided into desired paths, for example circular or spiral paths.

It will be seen that the electron beam 8a is deflectable in a conical space of which the point or apex is located in the vicinity of the pressure step stage 10/11, and of which the (virtual) base surface 8b completely fills the internal cross section of the reaction chamber 1 and thus the cross section of the flow. The height of this base surface, and thus the maximum deflection angle of the electron beam 8a, is determined on the basis of the considerations set forth above.

The reaction mixture, i.e., the flue gas and the gaseous reagent are fed to the reaction chamber 1 from beneath, i.e., in the direction of the arrow 13, and the converted reaction mixture, including the solid reaction products, is led off in the direction of arrow 14 through the elbow 2.

It can be seen that through the stated features each surface element (the integration of which forms the cross section) of the flow cross section of the reaction chamber running perpendicular to the axis A—A is traversable at at least one position of the flow path by the electron beam, assuming a suitably high deflection frequency of the electron beam 8a for a given flow velocity.

Figure 2:
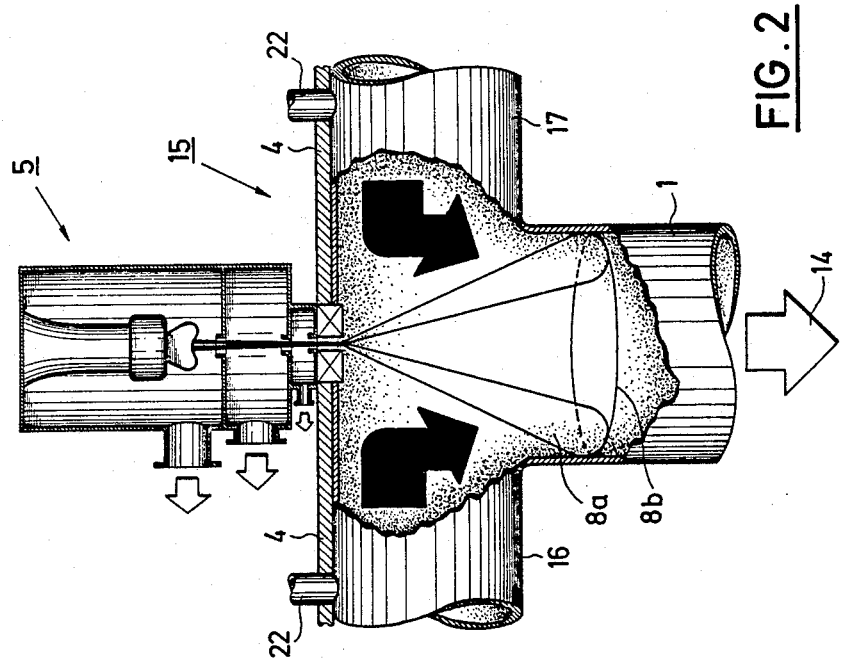
FIG. 2 is a front elevation view in partial cutaway of an electron beam source and the upper part of a reaction chamber with the addition of a supply arrangement for a plurality of component streams of the reaction mixture.

In the apparatus of FIG. 2, a supply arrangement 15 is located on the reaction chamber 1, which in the illustrated simplest case comprises two pipe sections 16 and 17 diametrically opening from the side. Through these pipe sections 16 and 17, two component flows of the reaction mixture are led in, which can be deflected out of an initial radial flow direction into an axial direction along the flow direction in the reaction chamber 1, as is indicated by the black outlined arrow. In this case the flow direction is opposite to that of FIG. 1, i.e., the reactants and the reaction products move away from the pressure step stage 10/11. The electron beam source 5 has the like construction as that of FIG. 1. The same provisions apply for the controls and deflection of the electron beam 8a.

The supply arrangement 15 of FIG. 2 can be further developed such that it comprises a cylindrical chamber of larger diameter than the reaction chamber 1 and that into this supply chamber are fed component flows of the reaction mixture from as many directions as desired. In this instance, it is useful to provide in the supply arrangement guide vanes (now shown here) which can be shaped in such fashion that a swirling flow is produced to swirl the reaction mixture.

In the battery arrangement of FIG. 3 there are arranged four reaction chambers 1 between a distributor duct 18 and a collector duct 19 whose axes are parallel but perpendicular to the axes of the distributor and collector ducts 18 and 19. The distributor duct 18 has in its upper part wall portions which lie within the four projection faces of the reaction chambers 1, these wall portions can be "inserted" into the reaction chambers. On these wall portions there are arranged—coaxially with the reactions chambers 1—four electron beam sources 5, the electron beams 8a from which extend into the reaction chambers 1. The geometric relations are shown only for the extreme left hand reaction chamber 1.

The ducts 18 and 19 each have very much larger cross sections as compared to the internal cross sections of the reaction chambers, in order to yield an equal flow division. Through the partitioning of the total flow to all four (or more) reaction chambers 1 there is produced an intensive and dependable interaction between the electron beams and the reactants.

All ducts can be provided further with heat insulation 20 as shown in FIG. 3 alone in connection with the distributor duct 18. FIG. 3 also shows that each of the electron beam sources 5 is provided with a high tension cable 21 for the current supply and controls for the electron beam sources.

Figure 4:
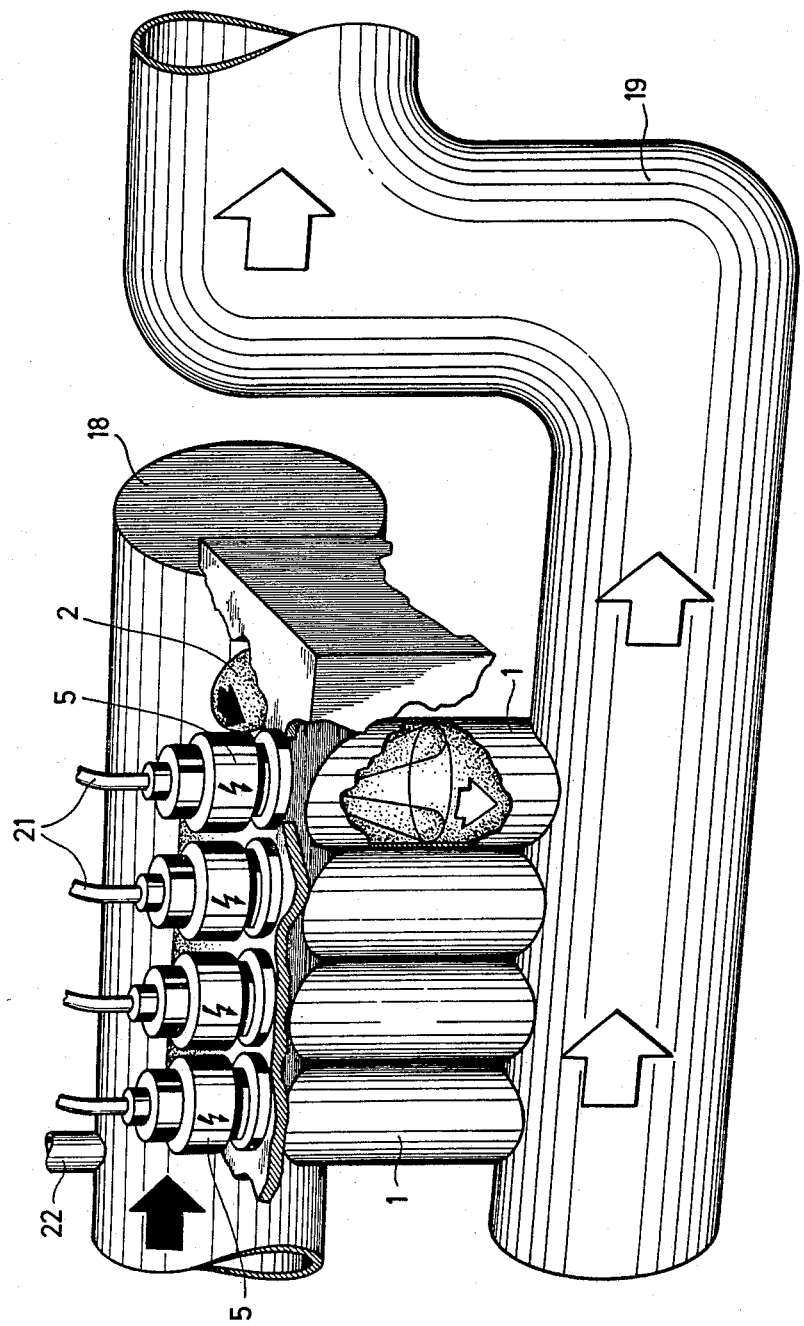
FIG. 4 illustrates a battery arrangement of four reaction chambers arranged with the interposition of elbows between a distributor duct and a collector duct.

From FIG. 4 it can be seen that four elbows 2 are arranged in parallel each with a reaction chamber 1 and an electron beam source 5 between a distributor duct 18 and a parallel collector duct 19. The construction and operation of each component part of the apparatus are the same as those in FIG. 1, except for the flow direction of the reactants and the reaction products. There is a broadly analogous operation to that of the apparatus according to FIG. 3.

It will be understood that the gaseous reagents will be admixed with the flue gases before the conversion step of the reactants with the electron beams, and then in such manner that as thorough a mixing as possible can take place. The feed ducts 22 for the gaseous reagents in FIGS. 1 to 4 have thus only a symbolic character.

In the apparatus according to FIGS. 3 and 4 it can naturally be arranged that individual reaction chambers 1 can be switched in and out, if one provides the necessary isolation means such as a gas tight type valve therefor, so that such battery arrangements can be adapted individually to the degree of loading from the flue gas source.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. Apparatus for cleaning a sulphur oxide and/or nitrogen oxide containing flue gas comprising:
    at least one reaction chamber having an axis and through which reactants pass at a pressure of from 1 to 5 bar;
    at least one evacuable electron beam source to produce an electron beam, said source being structurally combined with said least one reaction chamber;
    a pressure step stage through which said electron beam passes, said pressure step stage having an axis parallel to the axis of said reaction chamber;
    a deflection means for each said least one electron beam source for rotationally deflecting said electron beam about an axis so that each surface element of a flow cross section of the reaction chamber running perpendicular to the axis can be traversed by the electron beam at at least one position in the flow path.

2. The apparatus of claim 1, further comprising means for introducing the flue gas into said reaction chamber, and a separate means for introducing into said reaction chamber at least one gaseous reagent for reaction with said sulphur oxides and/or nitrogen oxides of said flue gas.

3. The apparatus of claim 1, wherein the axes of the pressure step stage and the reaction chamber are concurrent.

4. The apparatus of claim 1, wherein the electron beam is deflectable in a circular-section reaction chamber in a conical space of which the point is located in the vicinity of the pressure step stage and of which the base surface fills the flow cross section with a radiation dosage that amounts at every point to at least 1.5 megarad.

5. The apparatus of claim 1, wherein the reaction chamber adjoins an elbow on a wall portion of which lying in the projection face of the reaction chamber, the electron beam source is mounted.

6. The apparatus of claim 1, wherein the reaction chamber adjoins a duct arrangement through which can be fed to the reaction chamber several components of the mixture to be reacted, which can be deflected in the duct arrangement from an initial radial flow direction into an axial flow direction along the reaction chamber.

7. The apparatus of claim 6, wherein the duct arrangement has guide vanes to produce a swirling flow in the reaction chamber.

8. The apparatus of claim 1, wherein the electron beam source is oriented with regard to the reaction chamber so that the beam direction and the flow direction are coincident.

9. The apparatus of claim 5, wherein a plurality of elbows each with a reaction chamber and an electron beam source are arranged in parallel connection between a distributor duct and a collector duct.

10. The apparatus of claim 1, wherein a plurality of reaction chambers are arranged between a distributor duct and a parallel collector duct, each reaction chamber having an axis substantially parallel to that of the other reaction chambers and perpendicular to the axes of the distributor and collector ducts; and a plurality of electron beam sources located on wall parts of the distributor duct lying in the projection faces of the respective reaction chambers.

* * * * *